United States Patent
Mallick et al.

(10) Patent No.: US 9,258,242 B1
(45) Date of Patent: Feb. 9, 2016

(54) PATH SELECTION USING A SERVICE LEVEL OBJECTIVE

(71) Applicant: EMC Corporation, Hopkinton, MA (US)

(72) Inventors: Sanjib Mallick, Karnataka (IN); Ajith Balakrishnan, Karnataka (IN)

(73) Assignee: EMC Corporation, Hopkinton, MA (US)

( * ) Notice: Subject to any disclaimer, the term of this patent is extended or adjusted under 35 U.S.C. 154(b) by 58 days.

(21) Appl. No.: 14/133,705

(22) Filed: Dec. 19, 2013

(51) Int. Cl.
  H04L 1/00 (2006.01)
  H04L 12/851 (2013.01)
  H04L 12/803 (2013.01)
  H04L 12/24 (2006.01)

(52) U.S. Cl.
  CPC ........ H04L 47/2425 (2013.01); H04L 12/2417 (2013.01); H04L 12/2471 (2013.01); H04L 47/125 (2013.01)

(58) Field of Classification Search
  CPC ............ H04L 12/2417; H04L 12/2471; H04L 47/2425; H04L 47/125; H04B 17/00
  USPC .......................................................... 370/235
  See application file for complete search history.

(56) References Cited

U.S. PATENT DOCUMENTS

| | | | |
|---|---|---|---|
| 5,568,491 A | 10/1996 | Beal et al. | |
| 5,941,992 A | 8/1999 | Croslin et al. | |
| 6,636,981 B1 | 10/2003 | Barnett et al. | |
| 6,704,812 B2 | 3/2004 | Bakke et al. | |
| 6,725,295 B2 | 4/2004 | Iwatani | |
| 6,725,401 B1 | 4/2004 | Lindhorst-Ko | |
| 6,754,853 B1 | 6/2004 | DeKoning et al. | |
| 6,804,712 B1 | 10/2004 | Kracht | |
| 7,111,084 B2 | 9/2006 | Tan et al. | |
| 7,257,744 B2 | 8/2007 | Sabet et al. | |
| 7,260,628 B2 | 8/2007 | Yamamoto et al. | |
| 7,307,948 B2 | 12/2007 | Infante et al. | |
| 7,318,138 B1 | 1/2008 | Usgaonkar et al. | |
| 7,340,649 B2 | 3/2008 | Angamuthu et al. | |
| 7,349,961 B2 | 3/2008 | Yamamoto | |
| 7,370,241 B2 | 5/2008 | Nicholson et al. | |

(Continued)

OTHER PUBLICATIONS http://enterprise.symantec.com, Data Sheet: Storage Management, Veritas CommandCentral™ Storage by Symantec, Centralized Visibility and Control Across Heterogeneous Storage Environments; 4 Pages.

(Continued)

*Primary Examiner* — Sai-Ming Chan
(74) *Attorney, Agent, or Firm* — Daly, Crowley, Mofford & Durkee, LLP (57) ABSTRACT

In one aspect, a method includes measuring performance parameters for each path, determining classifications of each path based on a service level objective and sending I/Os using load balancing by the classifications determined. In another aspect, an apparatus includes electronic hardware circuitry configured to measure performance parameters for each path, determine classifications of each path based on a service level objective and send I/Os using load balancing by the classifications determined. In a further aspect, an article includes a non-transitory computer-readable medium that stores computer-executable instructions. The instructions cause a machine to measure performance parameters for each path, determine classifications of each path based on a service level objective and send I/Os using load balancing by the classifications determined.

20 Claims, 7 Drawing Sheets

(56) References Cited

U.S. PATENT DOCUMENTS

| | | | |
|---|---|---|---|
| 7,376,764 | B1 | 5/2008 | Todd |
| 7,406,039 | B2 | 7/2008 | Cherian et al. |
| 7,409,586 | B1 | 8/2008 | Bezbaruah et al. |
| 7,454,533 | B2 | 11/2008 | Miki |
| 7,475,328 | B2 | 1/2009 | Kubota et al. |
| 7,565,570 | B2 | 7/2009 | Dohi |
| 7,617,320 | B2 | 11/2009 | Alon et al. |
| 7,634,691 | B2 | 12/2009 | Komatsu et al. |
| 7,707,151 | B1 | 4/2010 | Blumenau et al. |
| 7,756,830 | B1 | 7/2010 | Chao et al. |
| 7,783,779 | B1 | 8/2010 | Scales et al. |
| 7,937,481 | B1 | 5/2011 | Sandstrom et al. |
| 7,962,567 | B1 | 6/2011 | Sandstrom et al. |
| 8,204,980 | B1 | 6/2012 | Sandstrom et al. |
| 8,843,789 | B2 | 9/2014 | Sandstrom et al. |
| 2002/0080445 | A1 | 6/2002 | Falkenstein et al. |
| 2002/0156888 | A1 | 10/2002 | Lee et al. |
| 2002/0156918 | A1 | 10/2002 | Valdevit et al. |
| 2003/0051195 | A1 | 3/2003 | Bosa et al. |
| 2003/0204786 | A1 | 10/2003 | Dinker et al. |
| 2003/0210416 | A1 | 11/2003 | Lewis et al. |
| 2003/0236074 | A1 | 12/2003 | Ishii et al. |
| 2004/0078632 | A1 | 4/2004 | Infante et al. |
| 2004/0117369 | A1 | 6/2004 | Mandal et al. |
| 2004/0205238 | A1 | 10/2004 | Doshi et al. |
| 2004/0210656 | A1 | 10/2004 | Beck et al. |
| 2004/0260736 | A1 | 12/2004 | Kern et al. |
| 2005/0015685 | A1 | 1/2005 | Yamamoto |
| 2005/0028028 | A1 | 2/2005 | Jibbe |
| 2005/0073998 | A1 | 4/2005 | Zhu et al. |
| 2005/0108450 | A1 | 5/2005 | Sahara et al. |
| 2005/0144511 | A1 | 6/2005 | Chih |
| 2005/0188126 | A1 | 8/2005 | Mashima et al. |
| 2005/0262562 | A1 | 11/2005 | Gassoway |
| 2006/0026346 | A1 | 2/2006 | Kadoiri et al. |
| 2006/0034181 | A1 | 2/2006 | Noguchi et al. |
| 2006/0047712 | A1 | 3/2006 | Shitomi et al. |
| 2006/0143332 | A1 | 6/2006 | Yagi et al. |
| 2006/0165002 | A1 | 7/2006 | Hicks et al. |
| 2006/0209707 | A1 | 9/2006 | Nakaya et al. |
| 2006/0253526 | A1 | 11/2006 | Welch et al. |
| 2007/0055797 | A1 | 3/2007 | Shimozono |
| 2007/0093124 | A1 | 4/2007 | Varney et al. |
| 2007/0112974 | A1 | 5/2007 | Shirogane et al. |
| 2007/0153683 | A1 | 7/2007 | McAlpine |
| 2007/0169186 | A1 | 7/2007 | Ueoka et al. |
| 2007/0234113 | A1 | 10/2007 | Komatsu et al. |
| 2008/0049637 | A1* | 2/2008 | Morrill et al. ............... 370/252 |
| 2008/0228987 | A1 | 9/2008 | Yagi et al. |
| 2009/0125754 | A1 | 5/2009 | Chandra et al. |
| 2009/0210620 | A1 | 8/2009 | Jibbe et al. |
| 2009/0257361 | A1 | 10/2009 | Deshpande et al. |
| 2009/0304380 | A1* | 12/2009 | Sadananda et al. ............ 398/26 |
| 2011/0314145 | A1* | 12/2011 | Raleigh et al. ............... 709/224 |

OTHER PUBLICATIONS

Sanscreen®, The Enabler for Storage service Management, Jan. 2006, 12 Pages.

RSA Technology Solution Brief: Powerpath® Encryption with RSA: The EMC Solution for Securing Data in Enterprise Storage, 16 Pages.

Office Action dated Aug. 10, 2009, for U.S. Appl. No. 11/819,609, filed Jun. 28, 2007 20 Pages.

Response to Office Action filed on Oct. 19, 2009 for U.S. Appl. No. 11/819,609 13 pages.

Office Action dated Feb. 2, 2010 for U.S. Appl. No. 11/819,609, filed Jun. 28, 2007 16 pages.

Response to Office Action filed on Apr. 12, 2010 for U.S. Appl. No. 11/819,609 5 pages.

Office Action dated Jul. 6, 2010 for U.S. Appl. No. 11/819,609 17 pages.

Response to Office Action dated Oct. 6, 2010 for U.S. Appl. No. 11/819,609 12 pages.

Final Office Action dated Dec. 23, 2010 for U.S. Appl. No. 11/819,609 15 pages.

Notice of Allowance dated Oct. 16, 2014 for U.S. Appl. No. 11/819,609 12 pages.

U.S. Appl. No. 11/819,612, filed Jun. 28, 2007; Part 1 of 2; 200 pages.
U.S. Appl. No. 11/819,612, filed Jun. 28, 2007; Part 2 of 2; 151 pages.
U.S. Appl. No. 13/476,072, filed May 21, 2012; Part 1 of 6; 400 pages.
U.S. Appl. No. 13/476,072, filed May 21, 2012; Part 2 of 6; 400 pages.
U.S. Appl. No. 13/476,072, filed May 21, 2012; Part 3 of 6; 400 pages.
U.S. Appl. No. 13/476,072, filed May 21, 2012; Part 4 of 6; 400 pages.
U.S. Appl. No. 13/476,072, filed May 21, 2012; Part 5 of 6; 400 pages.
U.S. Appl. No. 13/476,072, filed May 21, 2012; Part 6 of 6; 177 pages.
U.S. Appl. No. 11/819,609, filed Jun. 28, 2007; Part 1 of 2; 225 pages.
U.S. Appl. No. 11/819,609, filed Jun. 28, 2007; Part 2 of 2; 197 pages.
U.S. Appl. No. 11/475,060, filed Jun. 27, 2006 271 Pages.
U.S. Appl. No. 11/819,611, filed Jun. 28, 2007 284 Pages.
U.S. Appl. No. 14/329,336, filed Jul. 11, 2014 Part 1 of 11; 350 pages.
U.S. Appl. No. 14/329,336, filed Jul. 11, 2014 Part 2 of 11; 350 pages.
U.S. Appl. No. 14/329,336, filed Jul. 11, 2014 Part 3 of 11; 350 pages.
U.S. Appl. No. 14/329,336, filed Jul. 11, 2014 Part 4 of 11; 350 pages.
U.S. Appl. No. 14/329,336, filed Jul. 11, 2014 Part 5 of 11; 350 pages.
U.S. Appl. No. 14/329,336, filed Jul. 11, 2014 Part 6 of 11; 350 pages.
U.S. Appl. No. 14/329,336, filed Jul. 11, 2014 Part 7 of 11; 350 pages.
U.S. Appl. No. 14/329,336, filed Jul. 11, 2014 Part 8 of 11; 350 pages.
U.S. Appl. No. 14/329,336, filed Jul. 11, 2014 Part 9 of 11; 350 pages.
U.S. Appl. No. 14/329,336, filed Jul. 11, 2014 Part 10 of 11; 350 pages.
U.S. Appl. No. 14/329,336, filed Jul. 11, 2014 Part 11 of 11; 222 pages.

* cited by examiner

PATH SELECTION USING A SERVICE LEVEL OBJECTIVE

BACKGROUND

A path management product may be used to provide management of multiple paths that run from an application to storage devices. A path management product is typically a host-based solution that is used to manage storage area networks (SANs) and, among other things, can detect load imbalances for disk array controllers in a SAN and can identify alternate paths through which to route data. An example of path management product is EMC® POWERPATH® by EMC Corporation of Hopkinton, Mass.

SUMMARY

In one aspect, a method includes measuring performance parameters for each path, determining classifications of each path based on a service level objective and sending I/Os using load balancing by the classifications determined. In another aspect, an apparatus includes electronic hardware circuitry configured to measure performance parameters for each path, determine classifications of each path based on a service level objective and send I/Os using load balancing by the classifications determined. In a further aspect, an article includes a non-transitory computer-readable medium that stores computer-executable instructions. The instructions cause a machine to measure performance parameters for each path, determine classifications of each path based on a service level objective and send I/Os using load balancing by the classifications determined.

DETAILED DESCRIPTION

Described herein are techniques to select paths for I/Os that optimizes bandwidth based on service level objectives (SLOs) and load balancing techniques.

The following definitions may be useful in understanding the specification and claims.

HOST—at least one computer or networks of computers that runs at least one data processing application that issues I/O requests to one or more storage systems; a host connects to the SAN through an initiator;

I/O REQUEST—an input/output request to the storage device (sometimes referred to as an I/O), which may be a read I/O request (sometimes referred to as a read request or a read) or a write I/O request (sometimes referred to as a write request or a write).

Figure 1:
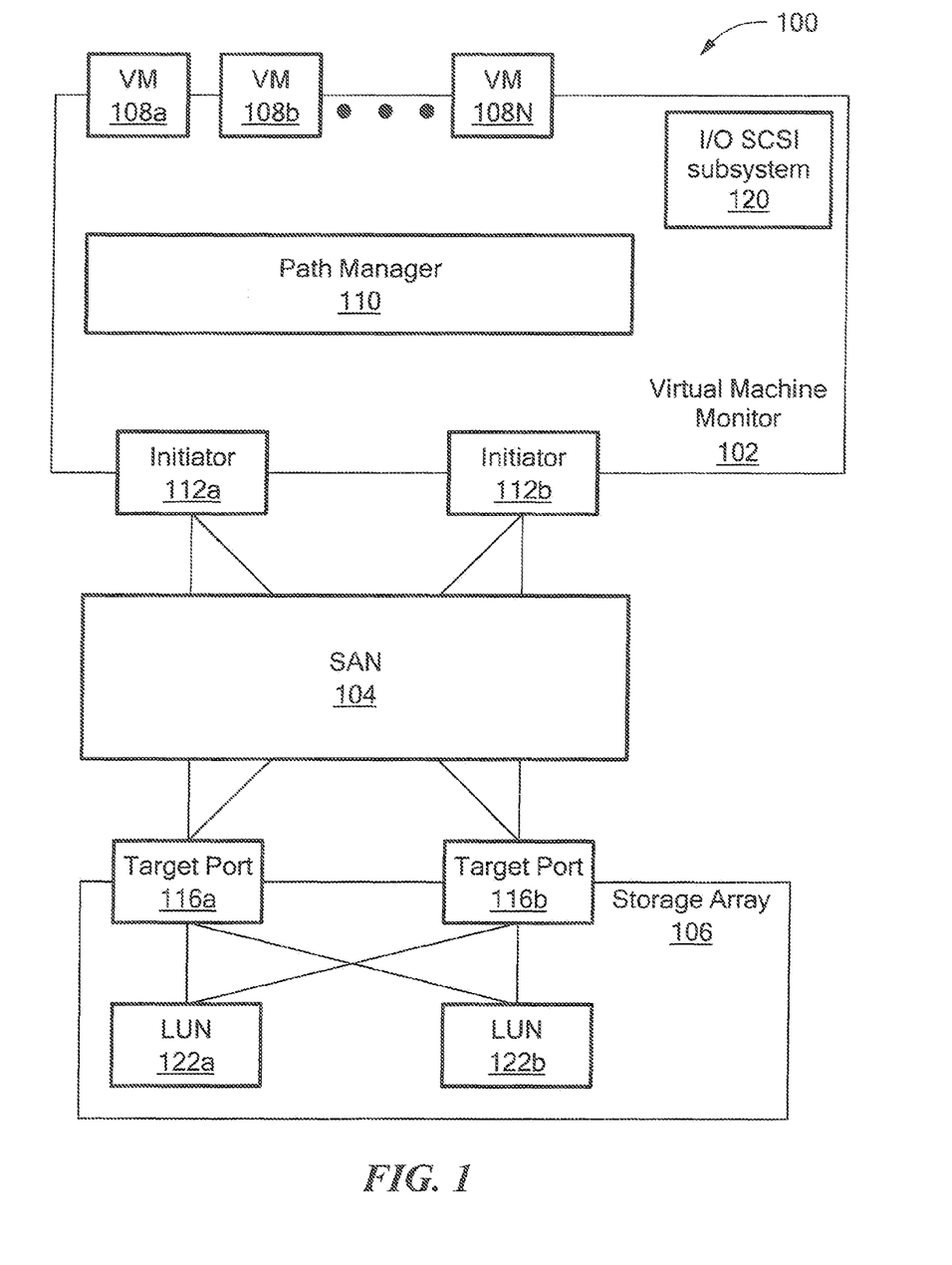
FIG. 1 is a block diagram of an example of a system having a virtual environment.

Referring to FIG. 1, a system 100, having a virtual environment, includes a virtual machine monitor 102 coupled to a storage array 106 by a storage area network 104. In one example, the virtual machine monitor 102 is a HYPERVISOR®. The virtual machine monitor 102 includes multiple instances of virtual machines (VMs) (e.g., a VM 108a, a VM 108b, . . . , a virtual machine 108N). The virtual machine monitor 102 includes initiator ports (e.g., an initiator port 112a and an initiator port 112b) and a path manager 110. The initiator ports 112a, 112b are physical connections that access the SAN 104.

The storage array 106 includes target ports (e.g., a target port 116a and a target port 116b) and logical units (e.g., a LUN 122a and a LUN 122b).

The multiple virtual environment accesses a shared storage (i.e., storage array 106) through a storage area network 104. The virtual machine monitor 102 generates and manages multiple instances of the virtual machines 108a-108M. Applications are hosted in the virtual machines 108a-108M which run different operating systems. In one example, the virtual machine monitor runs on a physical server (not shown).

Application access to the storage array 106 happens through a block 10 processing subsystem 120 (e.g., SCSI) in the virtual machine monitor 102. External storage systems are connected to the physical server through the initiator ports 112a, 112b through a SAN fabric and terminate at the target ports 116a, 116b at the storage array 106. In one example, the initiator ports 112a, 112b are Host Bus Adaptors (HBA) and the SAN 104 is a Fibre Channel.

The LUNs 122a, 122b are made visible to a server through the target ports 116a, 116b. A LUN can be visible through multiple target ports 116a, 116b and many LUNs can be present in this manner.

Thus, the virtual machine monitor 102 (and hence applications in VMs) can see multiple paths to a LUN. For example there are four paths to the LUN 122a shown in FIG. 1: 1) the initiator port 112a to the target port 116a to the LUN 122a; 2) the initiator port 112a to the target port 116b to the LUN 122a; 3) the initiator port 112b to the target port 116a to the LUN 122a; and 4) the initiator port 112b to the target port 116b to the LUN 122a. Typically, the paths from the initiator ports 112a, 112b to the target port 116a, 116b to the LUNs 122a. 122b established by the block I/O subsystem 120 resides in the virtual machine monitor 102.

The path manager 110 inserts itself into this block I/O subsystem 120 and manages the paths in such a way that I/Os are load balanced across all paths. In addition, if there is an I/O failure it ensures that the I/O will failover to another path.

The path manager 110 implements various load balancing methods which can be a simple I/O dispatch in a round robin manner or an adaptive algorithm. Adaptive load balancing policies achieve optimal throughput and response time across a wide range of conditions by considering multiple factors when choosing a path to send an I/O down. These factors include: number of I/Os, size of I/Os, whether the I/Os are reads or writes, observed queuing delay on each path and the throughput of recent I/Os.

These methods work well in a typical data center environment. However, the advent of virtual volumes changed the way data residing in storage arrays is accessed by an application. A virtual volume is a virtual machine data store natively residing inside an attached storage system. Many such virtual volumes can be bound to an entity called Protocol Endpoint (PE) and a PE is made visible through array target ports 116a, 116b to the virtual machine monitor 102.

Figure 2:
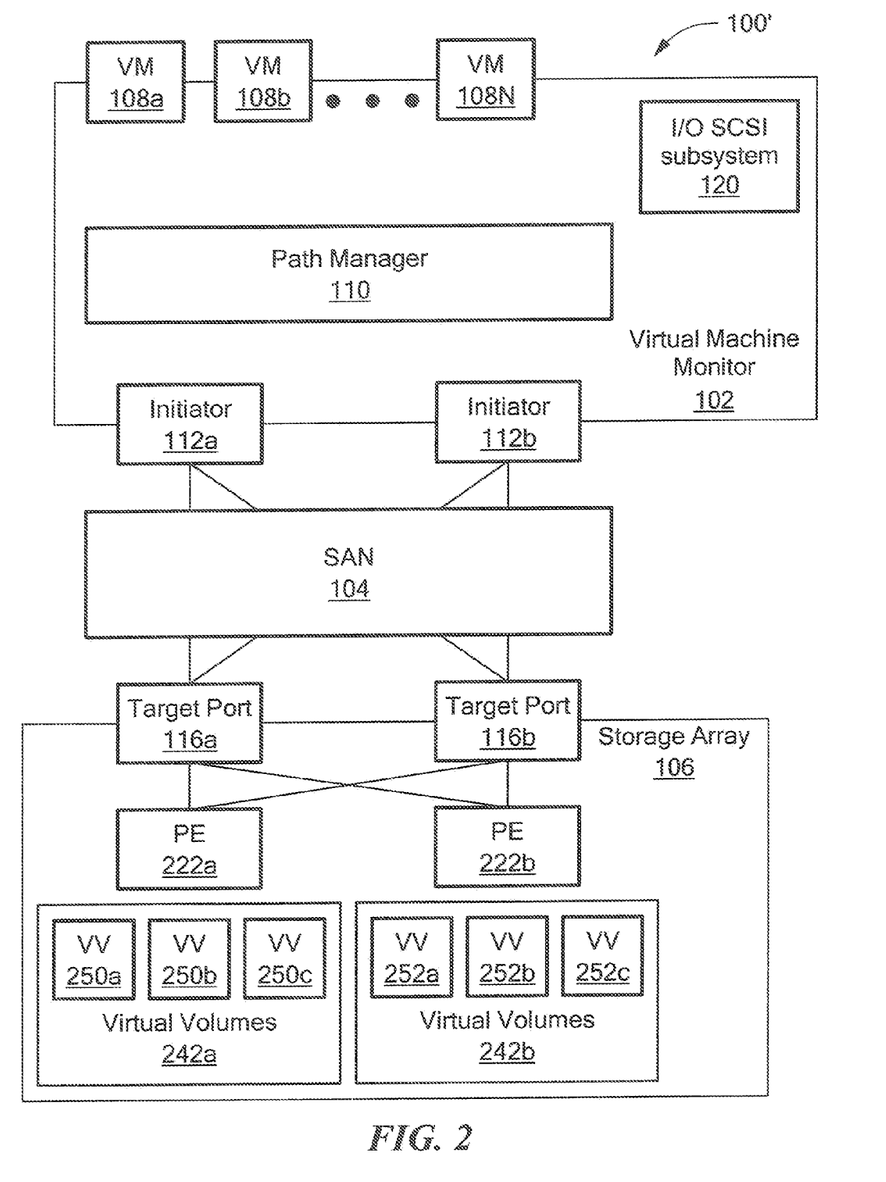
FIG. 2 is a block diagram of another example of a system having a virtual environment.

Referring to FIG. 2, a system 100' is the same as system 100 except for the following differences. The LUNs 122a-122b are replaced by PEs (e.g., a PE 222a and a PE 223b) and virtual volumes 242a, 242b. The virtual volumes 242a include virtual volumes 250a-250c and the virtual volumes 242b include virtual volumes 252a-252c.

A virtual volume is like a sub-LUN. The paths from the initiator ports 112a, 112b to the target port 116a, 116b to the LUNs 122a. 122b established by block I/O subsystems 120 terminates at PEs 222a, 222b. Any Array (which supports vVol) exposes something called "Storage containers" (SC) which is essentially a pool of storage tied with a "storage profile". The profile contains different performance attributes for example IOs per second, latency etc. Virtual volume "data stores" are created out of a part of storage container, hence performance attributes are inherent in the characteristics of a virtual volume. For example, the four paths to the PE 222a as seen by the block I/O subsystem 120 are: 1) the initiator port 112a to the target port 116a to the PE 222a; 2) the initiator port 112a to the target port 116b to the PE 222a; 3) the initiator port 112b to the target port 116a to the PE 222a; and 4) the initiator port 112b to the target port 116b to the PE 222a.

Each virtual volume can have different storage profiles including different performance attributes; however, the path manager 110 is not aware of these performance attributes. Load balancing done by the path manager 110 occurs across the paths from the initiator ports 112a, 112b to the target port 116a, 116b to the LUNs 122a established by the block I/O subsystem 120 that terminate at PEs 222a, 222b. The path manager 110 does not consider performance attributes of the virtual volumes, which is behind the PEs 222a, 222b.

For example, I/Os to a virtual volume with a highest class of service (CoS) (e.g., called a platinum service) which has an SLO for the highest performance and I/Os to another virtual volume with lower performance characteristics (e.g., called silver performance) bound to same PEs 222a, 222b will be load balanced in the same fashion by the path manager 110. This can defeat performance SLO associated with high performance virtual volumes.

Similar problems can happen if the LUNs (not a virtual volume or sub-LUN) have different SLOs for performance.

Figure 3:
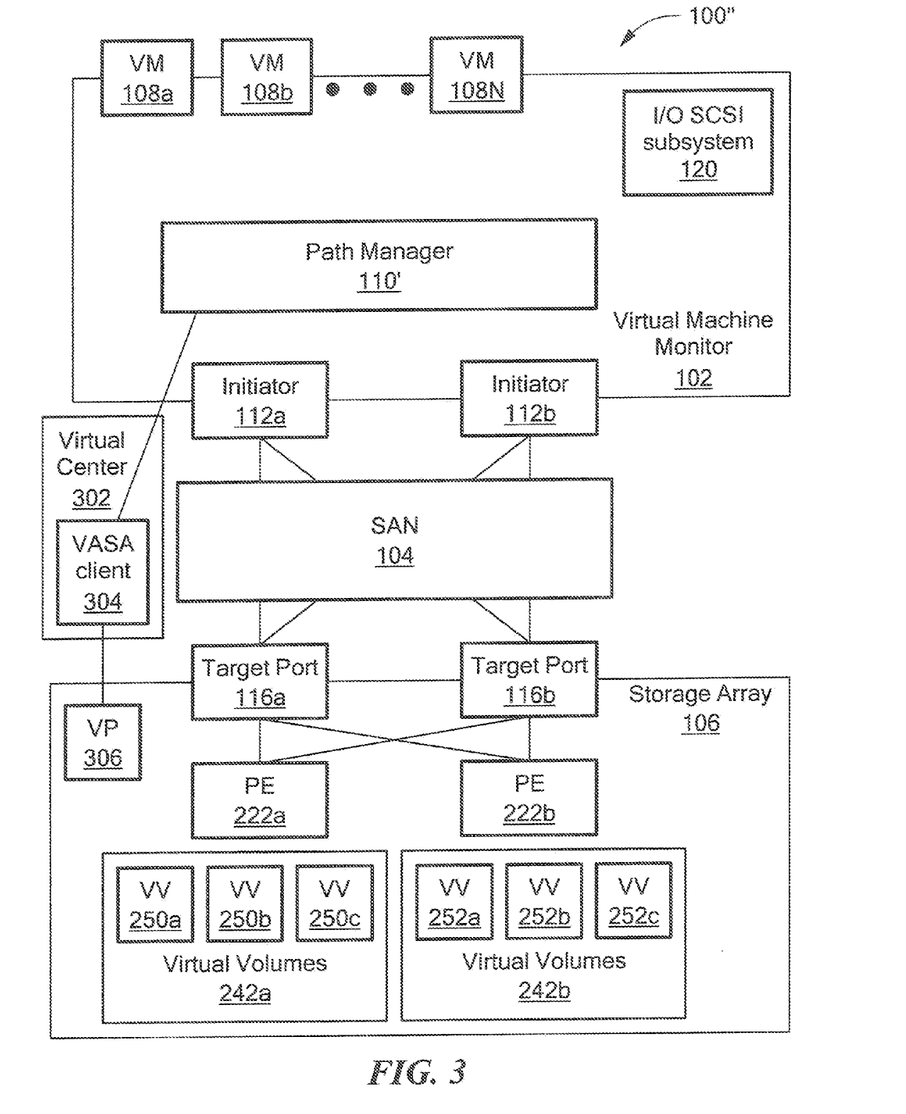
FIG. 3 is a block diagram of further example of a system having a virtual environment.
Figure 4:
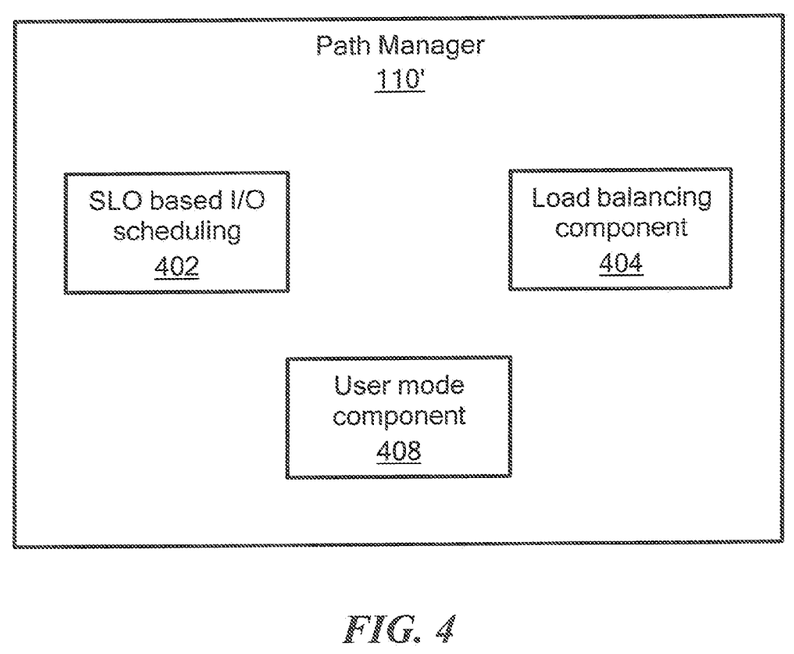
FIG. 4 is a block diagram of path manager of FIG. 3.

Referring to FIGS. 3 and 4, a system 100′″ is similar to system 100″ except system 100′″ includes a virtual center 302 with a VASA (vSphere Storage APIs-Storage Awareness) client 304 and the storage array, which includes a VASA provider 306. In addition, as explained further herein, the path manager 110′ has been modified from the path manager 110 to include SLO based I/O scheduling component 402, a load balancing component 404 and a user mode component 408.

The storage array 106′ communicates with the virtual center 302 via a VASA provider 306 to a VASA client 304 at the virtual center 302. The storage array 106″ exposes a storage container which associates storage profiles. Storage profiles typically contain IOPs and latency parameters. When a virtual volume is generated, data store are carved out from storage container matching the profile requirement that the virtual volume imposes. These parameters are captured and passed by an external agent to the path manager 110. The path manager 110′ also obtains a list of virtual volumes 250a-250c, 252a-252c bound to the protocol end points PE 222a, 222b it manages (using SCSI commands). The external agent, for example, may be a program (e.g., a user mode component 408) running on a computer system that is capable of communicating to storage array and path manager.

For example, the path manager 110′ uses a user mode component 408, which listens to the events when a virtual volume is getting bound or un-bound to a PE. The user mode component 408 extracts profile information from the virtual volume and passes relevant information to the path manager 110′ and so it can associate this information along with a current load balancing algorithm to give proper weight to virtual volume with high performance characteristics when dispatching an I/O.

The path manager 110′ keeps track of performance parameters such as I/O throughput and/or latency of all paths, for example. The SLO based I/O scheduling component 402 enables SLO based filtering during path selection. The path performance will be profiled after a certain time interval (e.g., 10 sec). I/Os that belong to the lowest class of service will be directed to the slowest paths so that the better paths are used for the higher class of service.

Figure 5:
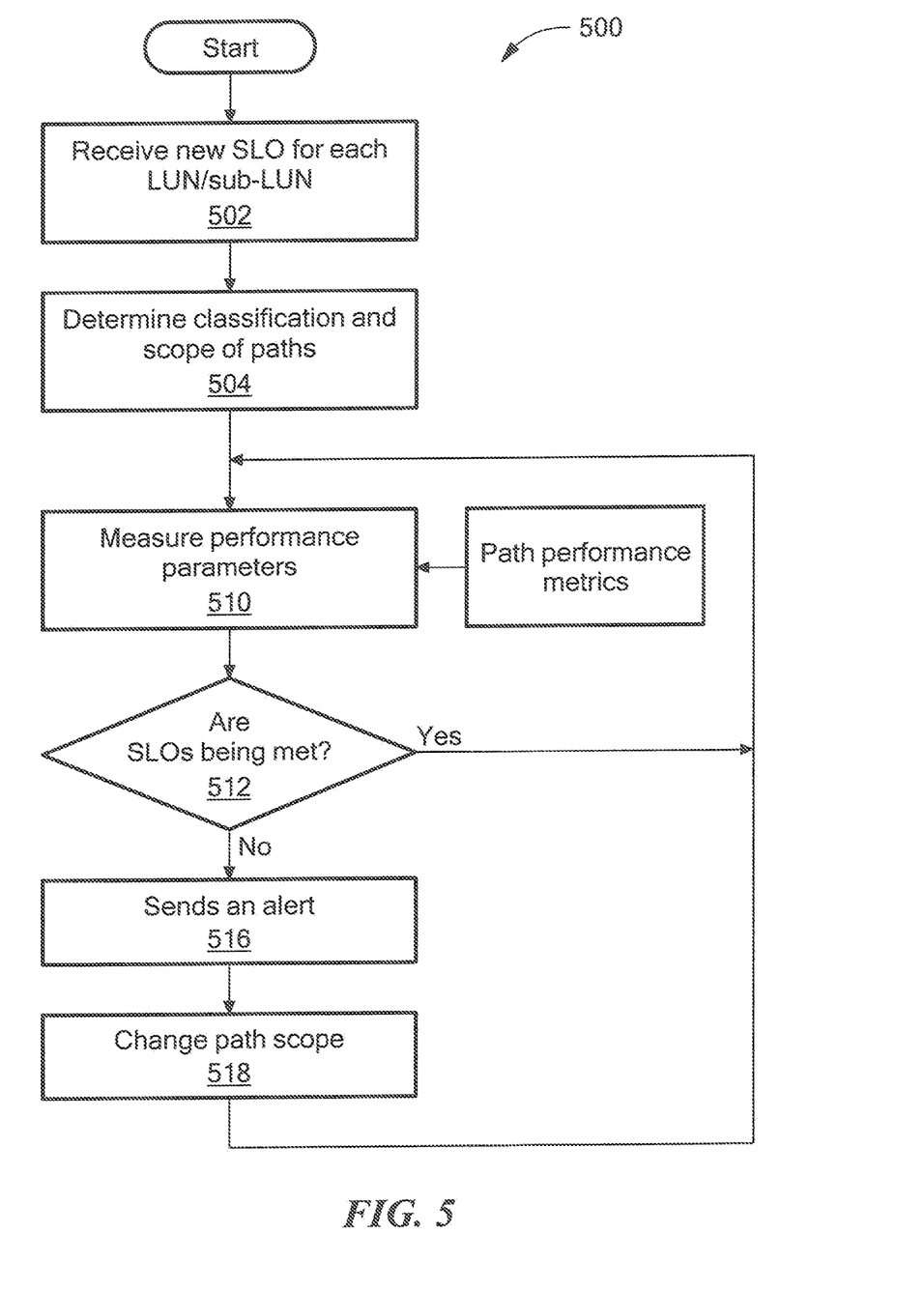
FIG. 5 is a flowchart of an example of a process to profile performance.

Referring to FIG. 5, an example of a process to profile performance is a process 500. Performance profiling is a periodic routine and responsibility of this routine is to measure performance of past compared to SLOs. Then, the routine readjusts path scopes associated to every class of service if necessary.

Process 500 receives new SLO for each LUN/sub-LUN (502). For example, the path manager 110 receives the performance parameters such as latency and/or throughput of each path.

Process 500 determines classification and scope of paths based on the SLO (504). For example, SLO based I/O scheduling component 402 performs classification of path for each LUN/sub-LUN. In one particular example, there are three classes of services: platinum, gold, and silver with respect to performance parameters (e.g., one or more of latency, throughput and so forth) and one LUN/sub-LUN is associated with each of these classes.

In one particular example, platinum represents the lowest latency and the highest throughput while silver represents the highest latency and the lowest throughput. There are 16 paths each having a latency L1, L2, . . . , L16, respectively, where L1>L2> . . . >L16) for any interval of time (e.g., 10 sec). The lowest class (e.g., silver) requires that I/Os are dispatched on the first five highest latency paths (L1-L5). The middle class (e.g., gold) requires that I/Os are dispatched on the first ten highest latency paths (L1-L10). The best class (e.g., platinum) class requires I/Os are dispatched in all of the paths (L1-L16).

Performance (in this example latency) profiling of the paths is performed on every nth second depending on latency values and path scope changes for each class. In one particular example, the period of time is 10 seconds.

Process 500 measures the performance parameters (510). For example, average latency of each of the service classes is measured.

$L\text{platinum} = \text{Average}(L1 \ldots L16)$ $L\text{gold} = \text{Average}(L1 \ldots L10)$ $L\text{silver} = \text{Average}(L1 \ldots L5)$ Here Lplatinum, Lgold, Lsilver represents average latency of each class. In other examples, average throughput is measured. In still further examples, average latency and average throughput are measured.

Process 500 determines if the SLOs are being met (512). If the SLOs are not being met, process 500 sends an alert (516). For example, an alarm is raised.

Process 500 changes the path scope (518) if the SLOs are not being met. For example, an attempt is made to re-adjust path selection. For example if Lplatinum has a higher than expected latency of platinum class, the path scope of the lower class is reduced (e.g., Psilver=flb(pl1 . . . pl4 or one path is deleted). If the lowest class (e.g., Lsilver) has a higher latency than the SLO requirement for that class, more paths are added to the scope (e.g., Psilver=flb(pl1 . . . pl6) or one extra path is added). Precedence is given to the highest class of service. Thus, the lower class of service may be compromised for higher class requirements. An example of this case might happen in a cloud environment when a platinum volume suddenly receives a high amount of transactions. With this method, path scope is readjusted so that a silver volume may get only one path to send an I/O (e.g., pl1 in this example). As a result of this adjustment, a platinum volume could meet the SLO and the silver volume might not. Necessary alarms are raised and once the load normalizes for the platinum volume, a path will be readjusted, so that silver volume would be able to meet SLO.

Figure 6:
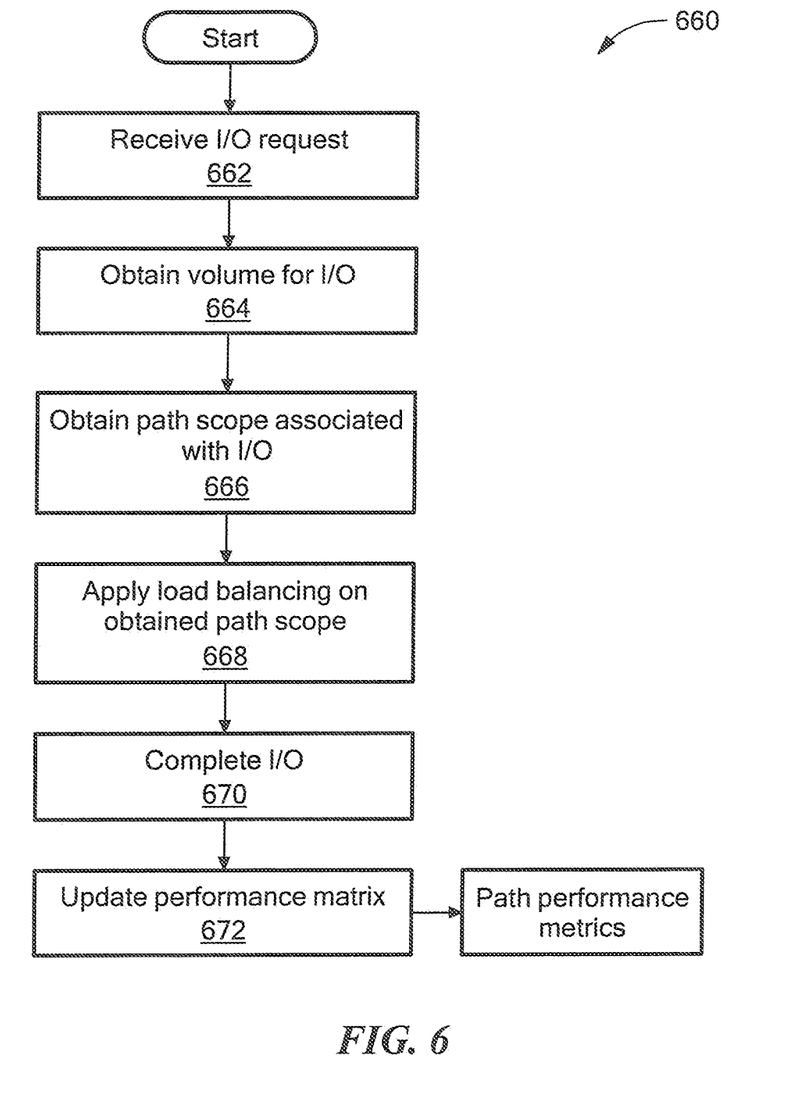
FIG. 6 is a flowchart of an example of a process to select a path based in service level objectives (SLOs).

Referring to FIG. 6, an example of selecting a path for an I/O based on SLOs is a process 600. Process 600 receives an I/O request (662) and obtains a volume for the I/O (664). Process 600 obtains path scope associated with the I/O (660)

Process 600 applies load balancing on the obtained path scope (668). The load balancing component 404 take these I/Os from SLO based I/O scheduling component and dispatches them to the storage device in the array using load balancing techniques such as round-robin or adaptive ensuring that the I/Os are distributed across the paths. For example, the lowest class of service dispatches I/Os on the slowest paths ultimately to the storage array. For example, the paths selected for different classes of I/Os can be represented by:

$$P\text{platinum}=flb(pL1\ldots pL16)$$

$$P\text{gold}=flb(pL1\ldots pL10)$$

$$P\text{silver}=flb(pL1\ldots pL5)$$

where $pL1, \ldots, pLn$ represent paths chosen by SLO Based I/O scheduling component 402 for each class. flb represent a load balancing algorithm used by the load balancing component 404 to return one path from the set of paths represented by pLi (where 0<i<16, for example). Some of the existing load balancing algorithms are intelligent to pick up less congested paths considering overhead of the pending I/Os, block size and so forth in each path.

Process 600 completes the I/O (670) and updates the performance matrix (672).

One of ordinary skill in the art would recognize that the examples given above can be generalized for any number classes of services and any number of LUN/sub-LUNs and for any number of paths and that throughput along with latency may be used separately or together as performance parameters.

One of ordinary skill in the art recognizes that the approaches described herein are not limited to virtual volumes. Similar methods may be adapted to any system that contains LUNs or sub-LUNs with different classes of services.

The techniques described herein may also be used if SLOs are tied to applications (as opposed to LUNs or sub-LUNs) also. For example, in VMWARE®, if a class of service is defined for a virtual machine (VM), it is possible to detect all LUNs, which a particular VM is using and apply the same methods described herein.

Figure 7:
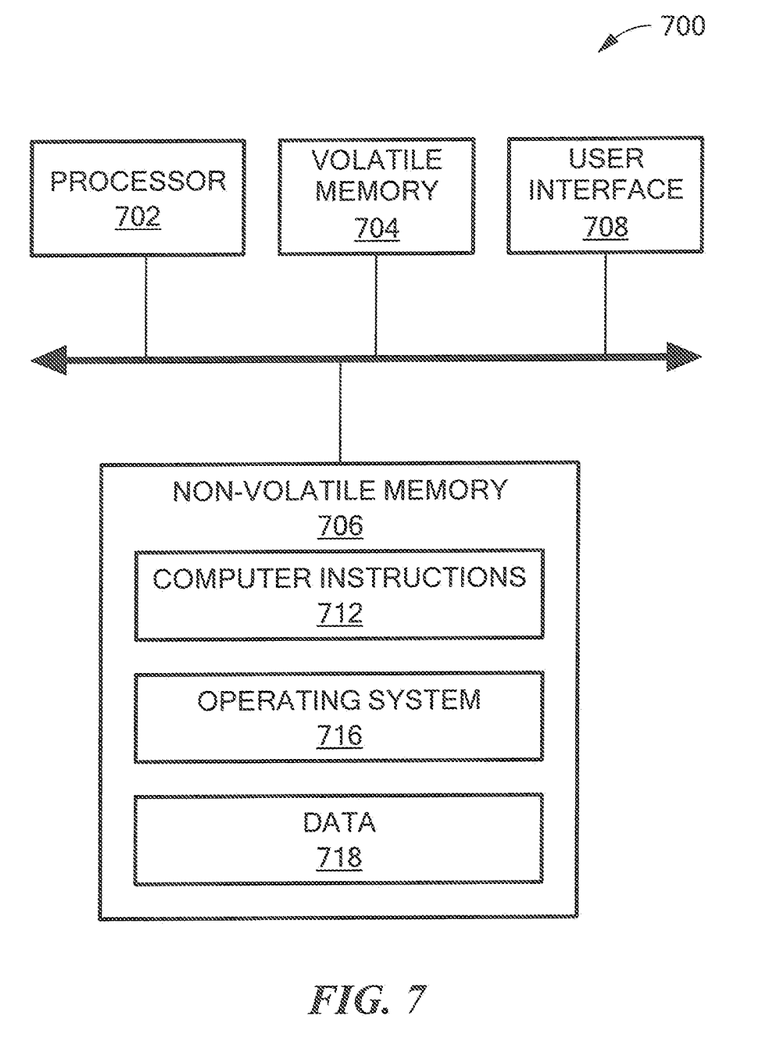
FIG. 7 is a computer on which any of the processes of FIGS. 5 and 6 may be implemented.

Referring to FIG. 7, a computer 700 includes a processor 702, a volatile memory 704, a non-volatile memory 706 (e.g., hard disk) and the user interface (UI) 708 (e.g., a graphical user interface, a mouse, a keyboard, a display, touch screen and so forth). The non-volatile memory 706 stores computer instructions 712, an operating system 716 and data 718. In one example, the computer instructions 712 are executed by the processor 702 out of volatile memory 704 to perform all or part of the processes described herein (e.g., processes 500 and 600).

The processes described herein (e.g., processes 500 and 600) are not limited to use with the hardware and software of FIG. 7; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 500 and 600 are not limited to the specific processing order of FIGS. 5 and 6, respectively. Rather, any of the processing blocks of FIGS. 5 and 6 may be re-ordered, combined or removed, performed in parallel or in serial, as necessary, to achieve the results set forth above.

The processing blocks (for example, in the processes 500 and 600) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Other embodiments not specifically described herein are also within the scope of the following claims.

What is claimed is:

1. A method comprising:
   measuring performance parameters of each path to one or more storage devices;
   determining which paths, to the one or more storage devices, are associated with each class based on a service level objective (SLO) and the performance parameters measured, the SLO being a required level of performance of the performance parameters by class;
   determining load balancing on the paths by class; and
   sending input/output requests (I/Os) using the load balancing determined.

2. The method of claim 1, further comprising:
   waiting an interval of time; and
   measuring current performance parameters after waiting the period of time.

3. The method of claim 2, further comprising changing the number of paths in a class if the current performance parameters measured exceed the SLO for that class or another class.

4. The method of claim 2 wherein measuring the current performance parameters comprises measuring an average performance value during at least a portion of the time interval.

5. The method of claim 2 wherein measuring an average performance value comprises measuring at least one of average latency or average throughput.

6. The method of claim 1 wherein measuring performance parameters for each path comprises measuring performance parameters comprising at least one of latency or throughput.

7. The method of claim 1, further comprising:
   receiving a new service level objective (SLO) for each LUN or sub-LUN;
   measuring the performance parameters after receiving the new SLO; and
   determine which paths, to the one or more storage devices, are associated with each class based on the new SLO and the performance parameters measured after receiving the new SLO.

8. The method of claim 1, further comprising generating an alert if a service level objective (SLO) is not being met.

9. The method of claim 1, further comprising:
   receiving a new service level objective (SLO) for a virtual machine;
   measuring the performance parameters after receiving the new SLO; and
   determine which paths, to the one or more storage devices, are associated with each class based on the new SLO and the performance parameters measured after receiving the new SLO.

10. An apparatus, comprising:
    electronic hardware circuitry configured to:
    measure performance parameters of each path to one or more storage devices;
    determine which paths, to the one or more storage devices, are associated with each class based on a service level objective (SLO) and the performance parameters measured, the SLO being a required level of performance of the performance parameters by class;
    determine load balancing on the paths by class; and
    send input/output requests (I/Os) using the load balancing determined.

11. The apparatus of claim 10 wherein the circuitry comprises at least one of a processor, a memory, a programmable logic device or a logic gate.

12. The apparatus of claim 10, further comprising circuitry configured to:
    wait an interval of time;
    measure current performance parameters after waiting the period of time; and
    change the number of paths in a class if the current performance parameters measured exceed the SLO for that class or another class,
    wherein measuring the current performance parameters comprises measuring an average performance value during at least a portion of the time interval, and
    wherein measuring an average performance value comprises measuring at least one of average latency or average throughput.

13. The apparatus of claim 10 wherein the circuitry configured to measure performance parameters for each path comprises circuitry configured to measure performance parameters comprising at least one of latency or throughput.

14. The apparatus of claim 10, further comprising circuitry configured to:
    receive a new service level objective (SLO) for each LUN or sub-LUN;
    measure the performance parameters after receiving the new SLO; and
    determine which paths, to the one or more storage devices, are associated with each class based on the new SLO and the performance parameters measured after receiving the new SLO.

15. The apparatus of claim 10, further comprising circuitry configured to:
    receive a new service level objective (SLO) for a virtual machine;
    measure the performance parameters after receiving the new SLO; and
    determine which paths, to the one or more storage devices, are associated with each class based on the new SLO and the performance parameters measured after receiving the new SLO.

16. An article comprising:
    a non-transitory computer-readable medium that stores computer-executable instructions, the instructions causing a machine to:
    measure performance parameters of each path to one or more storage devices;
    determine which paths, to the one or more storage devices, are associated with each class based on a service level objective (SLO) and the performance parameters measured, the SLO being a required level of performance of the performance parameters by class;
    determine load balancing on the paths by class; and
    send input/output requests (I/Os) using the load balancing determined.

17. The article of claim 16, further comprising instructions causing the machine to:
    wait an interval of time;
    measure current performance parameters after waiting the period of time; and
    change the number of paths in a class if the current parameters measured exceed the SLO for that class or another class, wherein measuring the current performance parameters comprises measuring an average performance value during at least a portion of the time interval, and wherein measuring an average performance value comprises measuring at least one of average latency or average throughput.

18. The article of claim 16 wherein the instructions causing the machine to measure performance parameters for each path comprises instructions causing the machine to measure performance parameters comprising at least one of latency or throughput.

19. The article of claim 16, further comprising instructions causing the machine to:
- receive a new service level objective (SLO) for each LUN or sub-LUN;
- measure the performance parameters after receiving the new SLO; and
- determine which paths, to the one or more storage devices, are associated with each class based on the new SLO and the performance parameters measured after receiving the new SLO.

20. The article of claim 16, further comprising instructions causing the machine to:
- receive a new service level objective (SLO) for a virtual machine;
- measure the performance parameters after receiving the new SLO; and
- determine which paths, to the one or more storage devices, are associated with each class based on the new SLO and the performance parameters measured after receiving the new SLO.

\* \* \* \* \*